Patented Nov. 8, 1932

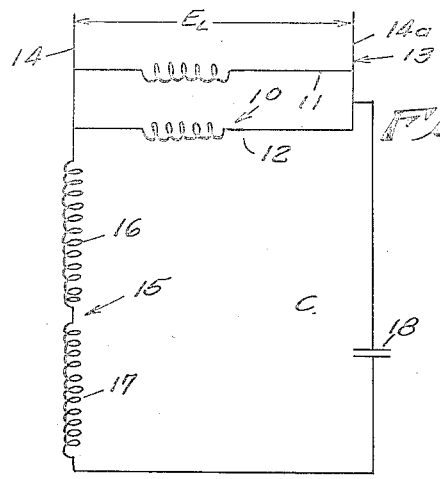
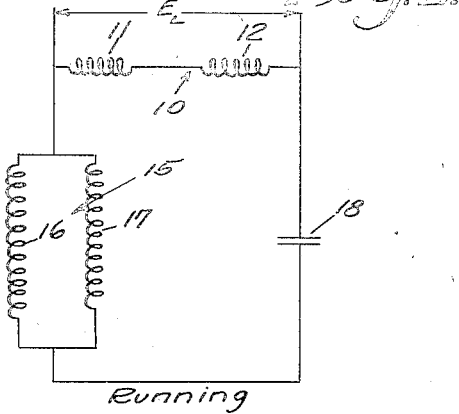
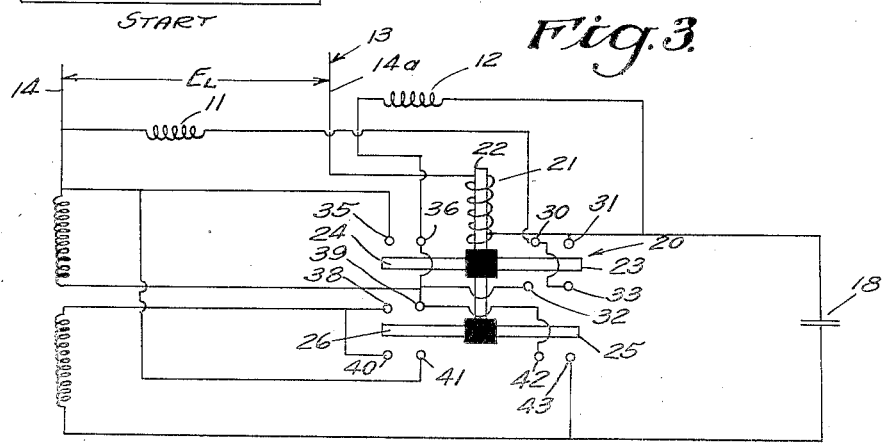
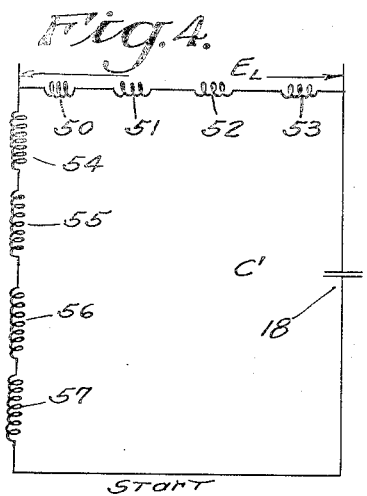
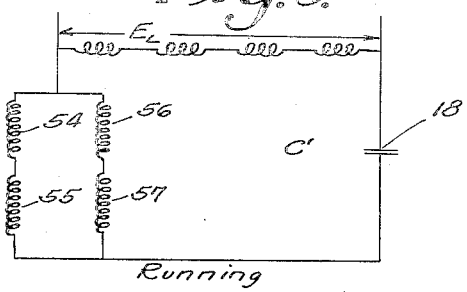

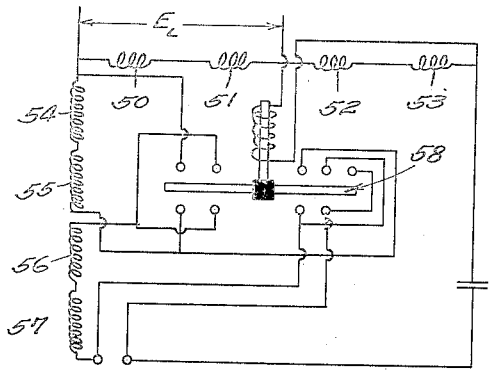
Fig. 6.
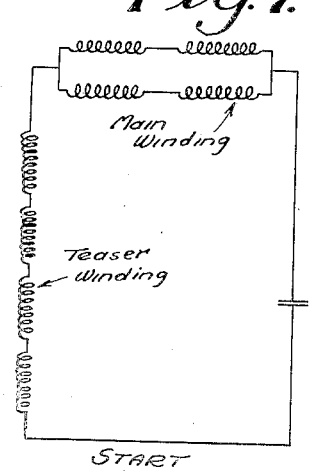
Fig. 7.
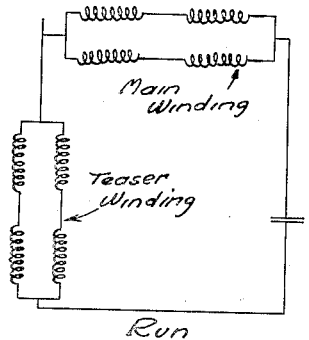
Fig. 8.
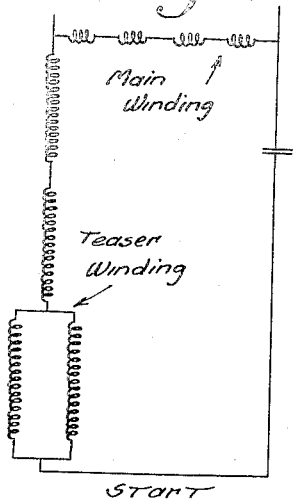
Fig. 9.
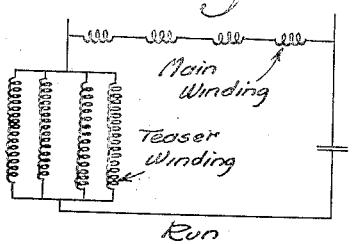
Fig. 10.
INVENTOR:
Thomas G. Myers
By
ATTORNEY.

1,886,895

UNITED STATES PATENT OFFICE

THOMAS G. MYERS, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA

METHOD OF STARTING CONDENSER TYPE MOTORS

Application filed October 7, 1929. Serial No. 397,782.

My invention relates to a novel method of starting condenser type motors.

Due to their better efficiency, and higher power factor, small motors of the condenser type are now being manufactured for use on single-phase circuits. These motors all comprise a main and a teaser winding, which windings are usually wound on the stator of an induction motor. The main winding is connected directly across the supply line, while the teaser winding is connected in series with a suitable condenser and the combination placed across the supply line. The condenser has the property of setting up a current which is substantially in quadrature with the current in the main winding, thus giving rise to a rotating field substantially equivalent to that which would be set up by a two-phase motor.

It is an object of this invention to provide a novel method of starting condenser type motors.

In starting such condenser type motors, it is extremely desirable that the voltage across the condenser be increased during the starting period so that a larger current will pass therethrough and through the teaser winding, for it has been found that the torque exerted by the motor increases with increased voltage across the condenser.

Several complicated and expensive devices are at present used by manufacturers in accomplishing this end. One device at present in use comprises an auto-transformer controlled by a centrifugal device for increasing the voltage during the starting period.

Another method at present in use for increasing the current through the teaser winding at start is to cut in an additional condenser in parallel with the ordinary condenser, thus increasing the current through the teaser winding during the starting period. Either of these methods is both expensive and cumbersome.

It is a primary object of my invention to form at least one of the windings of the motor in groups, and to connect these groups differently during the starting conditions from the connection during running conditions.

It is another object of this invention to provide a novel method of starting condenser type motors by forming the teaser winding thereof in groups, certain of which are alternately connected in series and parallel, dependent upon whether the motor is starting or running.

A further object of the invention is to provide a motor in which the ratio of turns in series in the teaser winding to turns in series in the main winding is greater during starting conditions than during running conditions, though all the forms of my invention are not limited to this change in ratio.

A further object of this invention is to provide a novel method of reducing the voltage applied to a condenser of a condenser type motor when this motor comes up to speed, the voltage supplied to this condenser being controlled as a function of the line current.

In certain installations, I have found it desirable to also form the main winding in groups, and to connect certain of these groups in parallel during the starting period, and it is an object of this invention to thus form a main winding.

Further objects and advantages of this invention will be made evident hereinafter.

Referring to the drawings, in which I have diagrammatically illustrated the electrical connections of my invention,—

Fig. 1 is a wiring diagram of the motor connections during start.

Fig. 2 is a wiring diagram of the motor connections after being brought up to speed.

Fig. 3 is a complete wiring diagram of the motor diagrammatically illustrated in Figs. 1 and 2.

Figs. 4 and 5 are similar to Figs. 1 and 2 and illustrate alternative methods of connecting the windings of the motor.

Fig. 6 is a complete wiring diagram of the motor illustrated in Figs. 4 and 5.

Figs. 7, 8, 9, and 10 are similar to Figs. 1, 2, 4, and 5, and illustrate alternative methods of connecting the windings of the motor.

Referring particularly to Figs. 1 and 2, the condenser type motor provides a main winding 10 formed of groups 11 and 12 which, in this form of my invention, are connected in parallel across a supply line 13 having conductors 14 and 14a of voltage $E_L$ during starting conditions, and which are connected in series across this supply line when the motor has reached normal speed. This main winding is ordinarily wound on the stator of an induction machine, as is also a teaser winding 15. This teaser winding I also form in groups, these groups being numbered 16 and 17 and being connected in series with each other and in series with a condenser 18 across the supply line 13 during the starting of the motor. The current through the teaser winding is substantially in quadrature with the current through the main winding due to the capacity of the condenser C. The inductance of the teaser winding also affects the position of the current vector of the teaser winding relative to the current vector of the main winding.

Basically, my invention comprises the connection of the groups of either or both of the windings in primary relationship during starting conditions and in secondary relationship during running conditions. It is often desirable to design these motors for high starting torque and for this purpose I prefer to connect the groups of the windings in such a manner that the ratio of turns in series in the teaser winding to turns in series in the main winding is greater during starting conditions than during running conditions.

Several methods of accomplishing this change in ratio are possible. Thus, either the turns in series in the teaser winding may be varied relative to the turns in series in the main winding or the turns in series in the main winding may be varied relative to a constant number of turns in series in the teaser winding. Similarly, the turns in series on both of these windings may be varied with respect to each other to accomplish this change in ratio.

The last method of connection is illustrated in Figs. 1 and 2, Fig. 1 illustrating the connections during starting conditions, and Fig. 2 illustrating the connections during running conditions. The voltage of the supply line $E_L$ is substantially constant in both instances. For the purpose of illustration, I have illustrated approximately one-half the number of turns per group in the groups 11 and 12 of the main winding as are present in the groups 16 and 17 of the teaser winding. Thus, in Fig. 1, there will be four times as many turns in series in the teaser winding as in the main winding, due to the fact that the groups of the main winding are connected in parallel and the groups of the teaser winding are connected in series. Thus, the ratio of the turns in series in the teaser winding relative to the turns in series in the main winding is substantially four to one. In Fig. 2, this ratio is substantially lower, due to the fact that the groups of the teaser winding are connected in parallel while the groups of the main winding are connected in series. In fact, the ratio of the turns in series in the teaser winding to turns in series in the main winding is unity.

The voltage across the condenser 18 is not only a function of the turns in series in the teaser winding, but also a function of the flux cutting this winding. Thus, the voltage across this condenser when the windings are connected as illustrated in Fig. 1 is substantially more than double the voltage across this condenser when the windings are connected as in Fig. 2. This is due to the fact that the flux in the main winding is almost doubled when the groups of this winding are connected as shown in Fig. 1 over the method of connection shown in Fig. 2, and this increased flux increases the voltage per turn generated in the teaser winding.

It should thus be apparent that the condenser 18 is subjected to a much higher voltage during starting conditions than during running conditions, this increase in voltage resulting in increased current passing through the condenser and through the teaser winding. The starting torque of the motor is thus enormously increased; in fact, the particular ratio shown in Figs. 1 and 2 are seldom used unless extremely high starting torques are desirable.

I accomplish the change in connection disclosed in Figs. 1 and 2 by means of a relay switch 20 which may be of any desired type. I prefer, however, to operate the relay switch as a function of the current in the supply line 13, this being made possible by placing a solenoid winding 21 in series with the supply circuit, this winding acting upon a plunger 22 which carries pallets 23, 24, 25, and 26.

Each of these pallets is insulated from the other, the pallet 23 being adapted to electrically connect terminals 30 and 31 when in an upper position and to connect terminals 32 and 33 when in a lower position. The pallet 24 connects terminals 35 and 36 when in an upper position, and disengages these terminals when in a lower position. Similarly, the pallet 26 electrically connects terminals 38 and 39 when in an upper position. When the pallet 26 moves into a lower position, terminals 40 and 41 are interconnected and simultaneously the pallet 25 connects terminals 42 and 43. The conductors connecting the windings 10 and 15, the condenser 18, and the terminals of the pallet switch are clearly indicated in Fig. 3.

The relay switch 20 is so designed that the pairs of terminals 32 and 33, 40 and 41, and 42 and 43, are respectively contacted by pallets 23, 26, and 25 when this switch is in a normal or running position. In other words, the plunger is normally in its lower position, this plunger being moved downward due to the weight thereof and to the weight of its associated pallets. At this time current flows from the conductor 14 of the supply circuit through group 11 of the main winding, terminals 32 and 33, and through group 12 of the main winding, whence the current passes through the solenoid winding 21 and returns to the other conductor 14a of the supply circuit.

Simultaneously, current flows from the conductor 14 of the supply circuit 13 through the group 16 of the teaser winding, through terminals 42 and 43, through the condenser 18, whence it returns to the conductor 14a of the supply circuit through the solenoid winding 21. A parallel path is set up from the conductor 14 of the supply circuit 13 through the terminals 40 and 41, and through the group 17 of the teaser winding, the current returning to the supply line through the condenser and solenoid winding. At this time the groups 11 and 12 of the main winding are in series and the groups 16 and 17 of the teaser winding are in parallel, the motor then being connected as shown in Fig. 2. This is the normal running position of the relay switch, and the current through the solenoid winding 21 is insufficient to overcome the weight of the plunger and its associated pallets.

When, however, the motor is being started, the current taken by the motor increases materially, and the plunger 22 is moved into its proper position. At this instant current may flow from the conductor 14 of the supply circuit through the group 11 of the main winding through terminals 30 and 31, and through the solenoid winding 21 whence it may return to the other conductor 14a of the supply circuit. A parallel path is set up from the conductor 14 of the supply circuit through terminals 35 and 36 and through the group 12 of the main winding, the current then returning to the conductor 14a of the supply circuit.

The groups 11 and 12 are at this instant connected in parallel, as shown in Fig. 1. Similarly, the groups 16 and 17 are connected in series, current flowing from the conductor 14 through the group 16, the terminals 38 and 39, and the group 17, the circuit to the supply line being completed through the condenser 18 and the solenoid winding 21. As the motor comes up to speed, the current required is greatly reduced and when this current has been reduced to a predetermined value, which is near the normal current consumption of the motor, the weight of the plunger 22 and associated pallets moves these members into their lower position, thus connecting the elements of the motor in its normal running relationship shown in Fig. 2.

In Figs. 4 and 5, I have illustrated a four-pole motor having a main winding including groups 50, 51, 52, and 53, and a teaser winding including groups 54, 55, 56, and 57. A relay control switch 58 similar to the one previously described is utilized for changing the connections from those shown in Fig. 4 to those shown in Fig. 5. In this instance, the groups 50 to 53 of the main winding are always connected in series with each other across the supply line regardless of the position of the relay switch. However, the groups 54 and 55 are connected in parallel with the groups 56 and 57 when the relay switch 58 is in a lower position.

The number of turns per group in the main winding is illustrated as being one-half of the number of turns per group in the teaser winding, thus making the ratio of the number of turns in the teaser winding to the number of turns in series in the main winding two to one in Fig. 4, and one to one in Fig. 5.

This alternative method of connecting the motor still embodies the novel method of connecting groups of the teaser winding in series during start, and in parallel after the motor has come up to speed. The operation of the relay switch is substantially the same as that outlined for Fig. 3. The electrical connections are, however, somewhat different to permit the change in connections indicated in Figs. 4 and 5. These connections are clearly shown in Fig. 6.

Figs. 7 and 8 illustrate another method of connecting a motor which is similar to that shown in Figs. 4 and 5, but utilizes the groups of the main winding in series-parallel relationship, two pairs of these groups being connected in series, these pairs being connected in parallel across the supply line. The ratios in these figures are similar to those shown in Figs. 4 and 5.

In Figs. 9 and 10, I have illustrated a main winding formed in four groups and permanently connected across the supply line, and a teaser winding formed in four groups, two of these groups being in series with two other groups connected in parallel during starting conditions, and all four of the groups of the teaser winding being connected in parallel during running conditions. If, for instance, the number of turns per group in the teaser winding is four times the number of turns per group in the main winding, as illustrated, the ratios of turns in series of the two windings will be two to one and one to one, as previously outlined for Figs. 4 to 8. If, however, the number of turns per group in the teaser winding be decreased to twice the number of turns per group contained in the main winding, the ratios of turns in series during starting conditions would be one and one-half to one. Similarly, this ratio would be nine to four in the event that the terms per group in the teaser winding had three times the turns per group in the main winding. The ratios of the turns in series during running conditions would also vary, and it should be understood that variations both as to the series-parallel connection of the groups, and as to the number of turns per group in the two windings may be utilized for varying the starting characteristics of the motor relative to the running characteristics thereof without departing from the spirit of my invention.

However, my invention in its broadest conception is not limited to the increase in ratio of turns in series in the teaser winding to turns in series in the main winding during starting conditions over running conditions. For instance, a system wherein the groups of the main winding are connected in series during starting conditions as are also the groups of the teaser winding, and wherein the groups of each winding are placed in parallel during running conditions provides a ratio of unity, yet such a connection is often advantageous where large starting torque is not necessary. The above-mentioned ratio may even be decreased as the motor comes up to speed if the starting current is to be limited. This may be accomplished, for instance, by permanently connecting the groups of the teaser winding in series and changing the groups of the main winding from parallel to series relationship when the motor gains speed.

I claim as my invention:

In a condenser type motor, the combination of: a stationary member; a rotatable member; a main winding on one of said members, said main winding being formed in groups; a teaser winding on one of said members, said teaser winding being formed in groups; means for connecting in parallel certain groups of said main winding and connecting in series certain groups of said teaser winding when starting said motor; and means for connecting in series at least a portion of the groups of said main winding previously connected in parallel, and connecting in parallel certain of said groups of said teaser winding formerly connected in series, when said motor comes up to speed.

In testimony whereof, I have hereunto set my hand at Los Angeles, California, this 28th day of September, 1929.

THOMAS G. MYERS.